(12) United States Patent
Nagai

(10) Patent No.: US 8,237,727 B2
(45) Date of Patent: Aug. 7, 2012

(54) IMAGE PROCESSING APPARATUS AND METHOD

(75) Inventor: Jun Nagai, Toshima-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1041 days.

(21) Appl. No.: 11/443,193

(22) Filed: May 31, 2006

(65) Prior Publication Data

US 2006/0279801 A1     Dec. 14, 2006

(30) Foreign Application Priority Data

Jun. 8, 2005 (JP) .................. 2005-168411

(51) Int. Cl.
*G09G 5/00* (2006.01)
(52) U.S. Cl. ....................... 345/581; 345/612
(58) Field of Classification Search ............. 345/581, 345/612

See application file for complete search history.

(56) References Cited

U.S. PATENT DOCUMENTS

| | | | | |
|---|---|---|---|---|
| 4,959,769 A | * | 9/1990 | Cooper et al. | 707/200 |
| 5,699,453 A | * | 12/1997 | Ozaki | 382/176 |
| 6,043,823 A | * | 3/2000 | Kodaira et al. | 345/619 |
| 6,137,905 A | * | 10/2000 | Takaoka | 382/173 |
| 6,650,435 B1 | * | 11/2003 | Ikeda | 358/1.9 |
| 6,744,533 B1 | * | 6/2004 | Easwar et al. | 358/1.9 |
| 2001/0024290 A1 | * | 9/2001 | Toriyama | 358/1.9 |
| 2002/0002570 A1 | * | 1/2002 | Sakai et al. | 707/526 |
| 2002/0018238 A1 | * | 2/2002 | Hirano | 358/1.16 |
| 2003/0002069 A1 | * | 1/2003 | Bhogal et al. | 358/1.15 |
| 2003/0086127 A1 | * | 5/2003 | Ito et al. | 358/462 |
| 2004/0167993 A1 | * | 8/2004 | Campbell et al. | 710/1 |
| 2005/0201624 A1 | * | 9/2005 | Hara et al. | 382/232 |
| 2005/0259295 A1 | * | 11/2005 | Nagao | 358/2.1 |

FOREIGN PATENT DOCUMENTS

| | | |
|---|---|---|
| JP | 2000-259819 | 9/2000 |
| JP | 2004-112695 | 4/2004 |

* cited by examiner

*Primary Examiner* — Maurice L McDowell, Jr.
(74) *Attorney, Agent, or Firm* — Fitzpatrick, Cella, Harper & Scinto

(57) ABSTRACT

If a larger number of pieces of attribute information are prepared so as to attain advanced input image processing and output image processing, the number of bits of each attribute signal increases, thus increasing the data size of the signal. For this reason, the storage capacity consumed by a storage unit that holds attribute signals may increase, and generation, write, and read speeds of attribute signals may decrease. To solve such problems, attribute regions included in a drawing command are discriminated, the number of types of attribute regions is counted to determine the bitwidth of attribute information based on the number of types of attribute regions, and the attribute information is generated by creating an attribute information table.

9 Claims, 22 Drawing Sheets

| ATTRIBUTE | bit1 | bit0 |
|---|---|---|
| | TEXT | GRAPHICS |
| PHOTOGRAPHIC | 0 | 0 |
| GRAPHICAL | 0 | 1 |
| TEXTUAL | 1 | 0 |
| LINE DRAWING | 1 | 1 |

FIG. 2

| ATTRIBUTE | bit1 TEXT | bit0 GRAPHICS |
|---|---|---|
| PHOTOGRAPHIC | 0 | 0 |
| GRAPHICAL | 0 | 1 |
| TEXTUAL | 1 | 0 |
| LINE DRAWING | 1 | 1 |

FIG. 3

| ATTRIBUTE | bit3<br>FINE OR SMALL | bit2<br>TEXT | bit1<br>GRAPHICS | bit0<br>GRAY |
|---|---|---|---|---|
| PHOTOGRAPHIC | 0 | 0 | 0 | 0 |
| PHOTOGRAPHIC AND GRAY | 0 | 0 | 0 | 1 |
| GRAPHICAL | 0 | 0 | 1 | 0 |
| GRAPHICAL AND GRAY | 0 | 0 | 1 | 1 |
| TEXTUAL | 0 | 1 | 0 | 0 |
| TEXTUAL AND GRAY | 0 | 1 | 0 | 1 |
| LINE DRAWING | 0 | 1 | 1 | 0 |
| LINE DRAWING AND GRAY | 0 | 1 | 1 | 1 |
| SMALL LETTER | 1 | 1 | 0 | 0 |
| SMALL LETTER AND GRAY | 1 | 1 | 0 | 1 |
| FINE LINE | 1 | 1 | 1 | 0 |
| FINE LINE AND GRAY | 1 | 1 | 1 | 1 |

FIG. 7

| ATTRIBUTE | bit3<br>FINE OR SMALL | bit2<br>TEXT | bit1<br>GRAPHICS | bit0<br>GRAY | DATA 1 | DATA 2 |
|---|---|---|---|---|---|---|
| PHOTOGRAPHIC | 0 | 0 | 0 | 0 | ○ | ○ |
| PHOTOGRAPHIC AND GRAY | 0 | 0 | 0 | 1 | × | × |
| GRAPHICAL | 0 | 0 | 1 | 0 | ○ | × |
| GRAPHICAL AND GRAY | 0 | 0 | 1 | 1 | ○ | × |
| TEXTUAL | 0 | 1 | 0 | 0 | × | × |
| TEXTUAL AND GRAY | 0 | 1 | 0 | 1 | ○ | × |
| LINE DRAWING | 0 | 1 | 1 | 0 | × | × |
| LINE DRAWING AND GRAY | 0 | 1 | 1 | 1 | ○ | × |
| SMALL LETTER | 1 | 1 | 0 | 0 | × | × |
| SMALL LETTER AND GRAY | 1 | 1 | 0 | 1 | ○ | × |
| FINE LINE | 1 | 1 | 1 | 0 | × | × |
| FINE LINE AND GRAY | 1 | 1 | 1 | 1 | × | × |
| | | | | TOTAL | 6 | 1 |

FIG. 8

| ATTRIBUTE | ORIGINAL | | | | NEW | | |
|---|---|---|---|---|---|---|---|
| | bit3 | bit2 | bit1 | bit0 | bit2 | bit1 | bit0 |
| PHOTOGRAPHIC | 0 | 0 | 0 | 0 | 0 | 0 | 0 |
| GRAPHICAL | 0 | 0 | 1 | 0 | 0 | 0 | 1 |
| GRAPHICAL AND GRAY | 0 | 1 | 1 | 1 | 0 | 1 | 0 |
| TEXTUAL AND GRAY | 0 | 1 | 0 | 1 | 0 | 1 | 1 |
| LINE DRAWING | 0 | 1 | 1 | 1 | 1 | 0 | 0 |
| SMALL LETTER AND GRAY | 1 | 1 | 0 | 1 | 1 | 0 | 1 |

FIG. 9

| ATTRIBUTE | ORIGINAL | | | | NEW |
|---|---|---|---|---|---|
| | bit3 | bit2 | bit1 | bit0 | bit0 |
| PHOTOGRAPHIC | 0 | 0 | 0 | 0 | 0 |

FIG. 12

| ATTRIBUTE | bit3<br>FINE OR SMALL | bit2<br>TEXT | bit1<br>GRAPHICS | bit0<br>GRAY | PROCESSING MODE 1 | PROCESSING MODE 2 |
|---|---|---|---|---|---|---|
| PHOTOGRAPHIC | 0 | 0 | 0 | 0 | ○ | ○ |
| PHOTOGRAPHIC AND GRAY | 0 | 0 | 0 | 1 | × | × |
| GRAPHICAL | 0 | 0 | 1 | 0 | × | ○ |
| GRAPHICAL AND GRAY | 0 | 0 | 1 | 1 | ○ | ○ |
| TEXTUAL | 0 | 1 | 0 | 0 | × | × |
| TEXTUAL AND GRAY | 0 | 1 | 0 | 1 | ○ | ○ |
| LINE DRAWING | 0 | 1 | 1 | 0 | × | × |
| LINE DRAWING AND GRAY | 0 | 1 | 1 | 1 | ○ | ○ |
| SMALL LETTER | 1 | 1 | 0 | 0 | × | × |
| SMALL LETTER AND GRAY | 1 | 1 | 0 | 1 | × | ○ |
| FINE LINE | 1 | 1 | 1 | 0 | × | × |
| FINE LINE AND GRAY | 1 | 1 | 1 | 1 | × | ○ |
| | | | | TOTAL | 4 | 7 |

DRAWING START
(X:○○, Y:○○)

DRAWING END
(X:△△, Y:△△)

FIG. 14

| ATTRIBUTE | bit3 FINE OR SMALL | bit2 TEXT | bit1 GRAPHICS | bit0 GRAY | PROCESSING MODE 1 | PROCESSING MODE 2 | PROCESSING MODE 3 |
|---|---|---|---|---|---|---|---|
| PHOTOGRAPHIC | 0 | 0 | 0 | 0 | ○ | 39584 | 256 |
| PHOTOGRAPHIC AND GRAY | 0 | 0 | 0 | 1 | × | × | 472 |
| GRAPHICAL | 0 | 0 | 1 | 0 | ○ | 666 | × |
| GRAPHICAL AND GRAY | 0 | 0 | 1 | 1 | ○ | 15320 | 3598 |
| TEXTUAL | 0 | 1 | 0 | 0 | × | × | × |
| TEXTUAL AND GRAY | 0 | 1 | 0 | 1 | ○ | 1024 | 1268 |
| LINE DRAWING | 0 | 1 | 1 | 0 | × | × | × |
| LINE DRAWING AND GRAY | 0 | 1 | 1 | 1 | ○ | 794 | 612 |
| SMALL LETTER | 1 | 1 | 0 | 0 | × | × | × |
| SMALL LETTER AND GRAY | 1 | 1 | 0 | 1 | ○ | 302 | 482 |
| FINE LINE | 1 | 1 | 1 | 0 | × | × | × |
| FINE LINE AND GRAY | 1 | 1 | 1 | 1 | × | 156 | 634 |
| | | | | TOTAL | 6 | 7 | 7 |

| | | |
|---|---|---|
| PROCESSING MODE 2 PRIORITY ORDER | 3 | 2 | 1 | 4 |
| PROCESSING MODE 3 PRIORITY ORDER | 2 | 1 | 3 | 4 |

FIG. 15

| ATTRIBUTE | bit3 | bit2 | bit1 | bit0 | NEW | | |
|---|---|---|---|---|---|---|---|
| | FINE OR SMALL | TEXT | GRAPHICS | GRAY | bit2 | bit1 | bit0 |
| PHOTOGRAPHIC | 0 | 0 | 0 | 0 | 0 | 0 | 0 |
| GRAPHICAL | 0 | 0 | 1 | 0 | 0 | 0 | 1 |
| GRAPHICAL AND GRAY | 0 | 0 | 1 | 1 | 0 | 1 | 0 |
| TEXTUAL AND GRAY | 0 | 1 | 0 | 1 | 0 | 1 | 1 |
| LINE DRAWING AND GRAY | 0 | 1 | 1 | 1 | 1 | 0 | 0 |
| SMALL LETTER AND GRAY | 1 | 1 | 0 | 1 | 1 | 0 | 1 |

FIG. 19

| ATTRIBUTE | bit3<br>FINE OR SMALL | bit2<br>TEXT | bit1<br>GRAPHICS | bit0<br>GRAY | DATA 1 | |
|---|---|---|---|---|---|---|
| | | | | | NUMBER OF PIXELS | FREQUENCY OF OCCURRENCE |
| PHOTOGRAPHIC | 0 | 0 | 0 | 0 | 39584 | 0.684 |
| PHOTOGRAPHIC AND GRAY | 0 | 0 | 0 | 1 | 0 | 0.000 |
| GRAPHICAL | 0 | 0 | 1 | 0 | 666 | 0.012 |
| GRAPHICAL AND GRAY | 0 | 0 | 1 | 1 | 15320 | 0.265 |
| TEXTUAL | 0 | 1 | 0 | 0 | 0 | 0.000 |
| TEXTUAL AND GRAY | 0 | 1 | 0 | 1 | 1024 | 0.017 |
| LINE DRAWING | 0 | 1 | 1 | 0 | 0 | 0.000 |
| LINE DRAWING AND GRAY | 0 | 1 | 1 | 1 | 794 | 0.014 |
| SMALL LETTER | 1 | 1 | 0 | 0 | 0 | 0.000 |
| SMALL LETTER AND GRAY | 1 | 1 | 0 | 1 | 302 | 0.005 |
| FINE LINE | 1 | 1 | 1 | 0 | 0 | 0.000 |
| FINE LINE AND GRAY | 1 | 1 | 1 | 1 | 156 | 0.003 |

F I G. 21

| ATTRIBUTE | bit3<br>FINE OR SMALL | bit2<br>TEXT | bit1<br>GRAPHICS | bit0<br>GRAY | NEW |
|---|---|---|---|---|---|
| PHOTOGRAPHIC | 0 | 0 | 0 | 0 | 1 |
| GRAPHICAL | 0 | 0 | 1 | 0 | 0001 |
| GRAPHICAL AND GRAY | 0 | 0 | 1 | 1 | 01 |
| TEXTUAL AND GRAY | 0 | 1 | 0 | 1 | 0011 |
| LINE DRAWING AND GRAY | 0 | 1 | 1 | 1 | 0010 |
| SMALL LETTER AND GRAY | 1 | 1 | 0 | 1 | 00001 |
| FINE LINE AND GRAY | 1 | 1 | 1 | 1 | 00000 |

IMAGE PROCESSING APPARATUS AND METHOD

FIELD OF THE INVENTION

The present invention relates to an image processing apparatus and method and, more particularly, to image processing for improving print image quality by appending attribute information to each pixel of a bitmap image.

BACKGROUND OF THE INVENTION

Image processing apparatuses using an electrophotographic method such as laser beam printers and the like have been prevalently used as output apparatuses of computers. Each of these image processing apparatuses receives and interprets a drawing command from a host computer or the like to generate a bitmap image, and then executes output processing on a sheet surface. When an image input apparatus such as a scanner, digital camera, or the like is connected, the image processing apparatus also has a function of applying predetermined image processing to a bitmap image input from such image input apparatus, and executing output processing on the sheet surface.

FIG. 1 is a block diagram showing the functional arrangement of an image processing apparatus. Processing for receiving a drawing command from a host computer and printing an image based on the drawing command will be described below using FIG. 1.

Application software runs on a host computer 101. The user of the host computer 101 creates a page layout document, wordprocessor document, graphic document, and the like using the application software. Digital document data created using the application software is transmitted to a printer driver (not shown) to generate a drawing command based on the digital document data. The printer driver generally describes the drawing command using a description language so as to create page image data of a page description language (PDL) or the like. The drawing command normally includes image, graphics, text drawing instructions and the like.

The drawing command generated by the printer driver is transferred to an image processing apparatus 103 via a network or the like. The image processing apparatus 103 comprises a drawing command processor 105, input image processor 106, output image processor 107, storage unit 108, and the like.

The drawing command processor 105 generates drawing objects by interpreting the drawing command received from the host computer 101, and generates a bitmap image by rasterizing the drawing objects.

The output image processor 107 converts the bitmap image into an image format which can be processed by a printer engine 111 of an image output apparatus 104. Furthermore, when the bitmap image generated by the drawing command processor 105 is a multi-grayscale RGB image, the output image processor 107 executes color conversion processing for converting RGB values into CMYK values using a lookup table and the like. Also, the output image processor 107 executes pseudo halftone processing for converting the multi-grayscale image into a low-grayscale image using dithering or the like.

The image output apparatus 104 has the printer engine 111, receives image data of the predetermined image format from the image processing apparatus 103, and prints it on a sheet surface. Normally, in order to stably express a halftone image by the printer engine 111, the multi-grayscale image must be converted into a low-grayscale image such as two gray levels, four gray levels, 16 gray levels, or the like. Also, in general, input data to the printer engine 111 are color data corresponding to color materials of four colors, i.e., cyan (C), magenta (M), yellow (Y), and black (K). In other words, image data to be input to the printer engine 111 includes low-grayscale (two- to 16-gray level) CMYK image data.

In this way, by transferring image data generated by the image processing apparatus 103 to the printer engine 111 of the image output apparatus 104, an image is printed on the sheet surface, thus completing print processing based on the drawing command output from the host computer 101.

Print processing of a bitmap image input from an image input apparatus 102 such as a scanner 109, digital camera 110, or the like will be described below.

The scanner 109 optically scans an image printed on a paper sheet, film, or the like, and analog-to-digital (A/D) converts a signal according to the intensity of the reflected or transmitting light, thus reading a bitmap image. The digital camera 110 acquires a bitmap image of an object by A/D-converting a signal according to the intensity of light output from a device such as a CCD or the like. A bitmap image output from such image input apparatus 102 is normally an RGB image.

The image processing apparatus 103 converts the bitmap image input from the scanner 109 or digital camera 110 into low-grayscale CMYK image data using the input image processor 106 and output image processor 107. By transferring the CMYK image data to the printer engine 111 of the image output apparatus 104, an image is printed on a sheet surface. In this way, the print processing of the bitmap image output from the image input apparatus 102 is completed.

In order to improve the print image quality in the processes of the image data, attribute information indicating a feature of an image region where each pixel of image data exists is appended to that pixel in some cases. That is, attribute information indicating a feature of an image region such as a photo region, text region, or the like is appended to each pixel, and image processing of the image processing apparatus 103 and image output apparatus 104 is switched based on that attribute information. In this way, optimal image quality to each image region can be provided (for example, Japanese Patent Laid-Open No. 2000-259819).

Also, a dither matrix used in the pseudo halftone processing is switched depending on data types such as image, graphics, text, and the like included in the drawing command. Furthermore, a lookup table (LUT) used in color conversion from RGB data into CMYK data is switched, thus improving the image quality. A practical example will be described below. The drawing command processor 105 generates a bitmap image upon rasterizing the drawing command, generates attribute signals indicating image regions in which respective pixels of the bitmap image are included at the same time, and stores them in the storage unit 108. The output image processor 107 discriminates an image region in which each pixel that forms the bitmap image is included by reading out each attribute signal from the storage unit 108, thereby switching the color conversion processing and pseudo halftone processing. In this manner, the image processing can be switched depending on the types of data included in the drawing command.

As for an image input from the scanner 109, the image processing can be switched for respective image regions. In this case, the input image processor 106 applies image region discrimination using, e.g., pattern matching to the input bitmap image. Also, the input image processor 106 discriminates an image region such as a photo region or text region, a chromatic region or achromatic region, a halftone dot region, or the like, and pixels which form that region. The input image processor 106 generates attribute signals based on this discrimination result, and stores them in the storage unit 108.

The input image processor 106 reads out the attribute signal from the storage unit 108 and applies processing for emphasizing the sharpness of a character by emphasizing the high-frequency component of an image to each pixel of the text region. Also, the input image processor 106 applies so-called low-pass filter processing to each pixel of the halftone dot region to remove, e.g., moiré components unique to a scanned image.

The output image processor 107 reads out the attribute signal from the storage unit 108, and executes image processing such as color conversion processing, pseudo halftone processing, and the like based on the attribute signal, thus converting the bitmap image into the image format that can be output to the printer engine 111. In this manner, the image processing can be switched for respective image regions that have undergone the image region discrimination.

In consideration of application of more advanced image processing corresponding to each image region, the image regions must be classified more finely in correspondence with their image characteristics. Also, the drawing command often describes data types of more detailed levels. When such classification of image regions is done, a larger number of attribute signals are required.

FIG. 2 shows an example of attribute signals corresponding to four different image regions, i.e., a text region, graphics region, photo region, and line drawing region.

Referring to FIG. 2, bit 0 of an attribute signal indicates graphics characteristics, and bit 1 indicates text characteristics. Therefore, an attribute signal '10' indicates a text region; '01', a graphics region; and '00', a photo region. In addition, '11' is defined as "line drawing", and can represent a line drawing region.

FIG. 3 shows an example of attribute signals when image regions are classified more finely.

For example, when an attribute associated with an under color removal (UCR) setting (whether or not to perform, e.g., 100% UCR) is appended to each pixel, a bit indicating gray characteristics (bit 0 in FIG. 3) is added. When an attribute associated with a small letter or fine line is to be appended, a bit indicating fine or small characteristics (bit 3 in FIG. 3) is added.

If a larger number of pieces of attribute information are prepared so as to attain advanced input image processing and output image processing, the number of bits of each attribute signal increases, thus increasing the data size of the signal. For this reason, the storage capacity consumed by the storage unit 108 that holds attribute signals may increase, and generation, write, and read speeds of attribute signals may decrease. To solve such problems, for example, the bitmap image may be converted into a low-resolution image or some bits may be deleted. However, such solutions result in poor image quality.

The present applicant has proposed a method of avoiding the aforementioned problems by determining the format of attribute signals based on information of connected external apparatuses. However, the limited number of bits of each attribute signal cannot often express a detailed image region (for example, Japanese Patent Laid-Open No. 2004-112695).

SUMMARY OF THE INVENTION

The first aspect of the present invention discloses an image processing apparatus comprising:

a discriminator, arranged to discriminate attribute regions to which pixels of image data belong for respective pixels of the image data;

a determiner, arranged to determine a bitwidth of attribute information indicating the attribute region, to which the pixels of the image data belong, in accordance with the number of types of attribute regions; and a generator, arranged to generate the attribute information by creating a table indicating correspondence between the attribute information and the types of attribute regions.

According to the present invention, the bitwidth of attribute information can be dynamically controlled in accordance with image data.

The second aspect of the present invention discloses an image processing apparatus comprising:

a discriminator, arranged to discriminate attribute regions to which pixels of image data belong for respective pixels of the image data;

a determiner, arranged to determine a bitwidth of attribute information indicating the attribute region, to which the pixels of the image data belong, in accordance with information indicating a processing mode appended to the image data; and a generator, arranged to generate the attribute information by creating a table indicating correspondence between the attribute information and the types of attribute regions.

According to the present invention, the bitwidth of attribute information can be dynamically controlled in accordance with the processing mode of image data.

In this way, according to the present invention, even when a large number of pieces of attribute information are prepared, the number of bits of each attribute information is controlled in accordance with the image data or processing mode. Therefore, an increase in storage capacity that holds attribute information, and a decrease in generation, write, and read speeds of attribute information can be suppressed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 shows an example of attribute signals corresponding to four different image regions, i.e., a text region, graphics region, photo region, and line drawing region;

FIG. 3 shows an example of attribute signals when image regions are classified more finely;

FIG. 7 shows a practical example of a table created by an attribute discrimination unit;

FIGS. 8 and 9 show practical examples of a table created by an attribute information table creation unit;

FIG. 12 shows a practical example of a table created by an attribute discrimination unit;

FIG. 14 shows a practical example of a table created by an attribute discrimination unit according to the fourth embodiment;

FIG. 15 shows an example of an attribute information table;

FIG. 19 is a view for explaining a method of creating an attribute information table by an attribute discrimination unit and attribute information table creation unit according to the fifth embodiment;

FIGS. 20 and 21 are views for explaining a method of creating an attribute information table by an attribute discrimination unit and attribute information table creation unit.

DETAILED DESCRIPTION OF THE PREFERRED EMBODIMENTS

Image processing according to the preferred embodiments of the present invention will be described hereinafter with reference to the accompanying drawings. An example in which the present invention is applied to a multi-functional peripheral equipment (MFP) will be described hereinafter. However, the present invention is not limited to the MFP, and can be applied to arbitrary image processing apparatuses within the scope of its gist.

First Embodiment

An MFP comprises a plurality of functions such as an image scanning function, image forming function, image communication function, and the like. The MFP executes and processes various jobs such as a print job for printing an image on a print medium, a scan job for scanning an image from a document, a FAX job for making an image communication with an external apparatus, a copy job for forming an image scanned from a document on a print medium, and the like.

[Arrangement of MFP]

Figure 1:
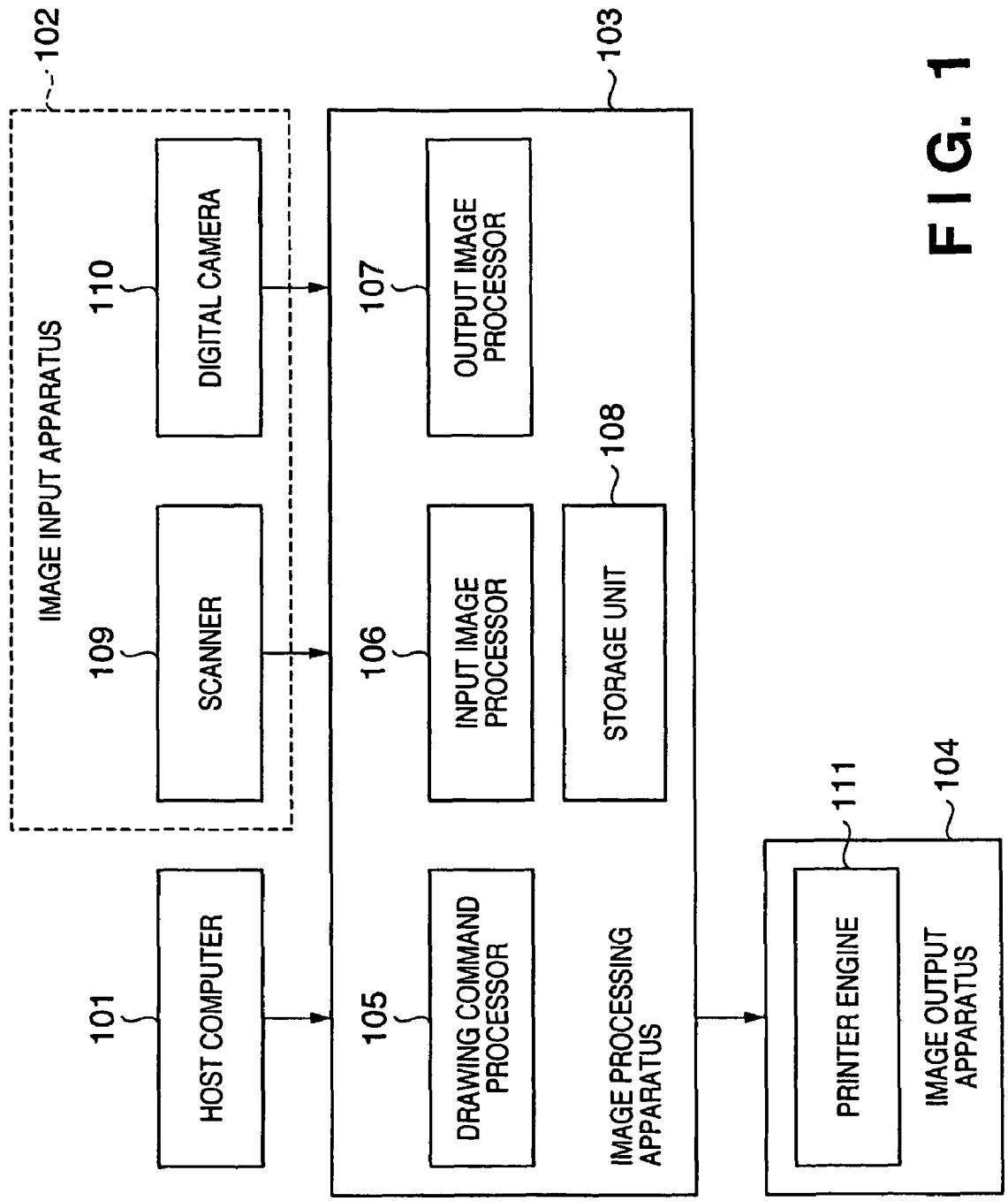
FIG. 1 is a block diagram showing the functional arrangement of an image processing apparatus.
Figure 4:
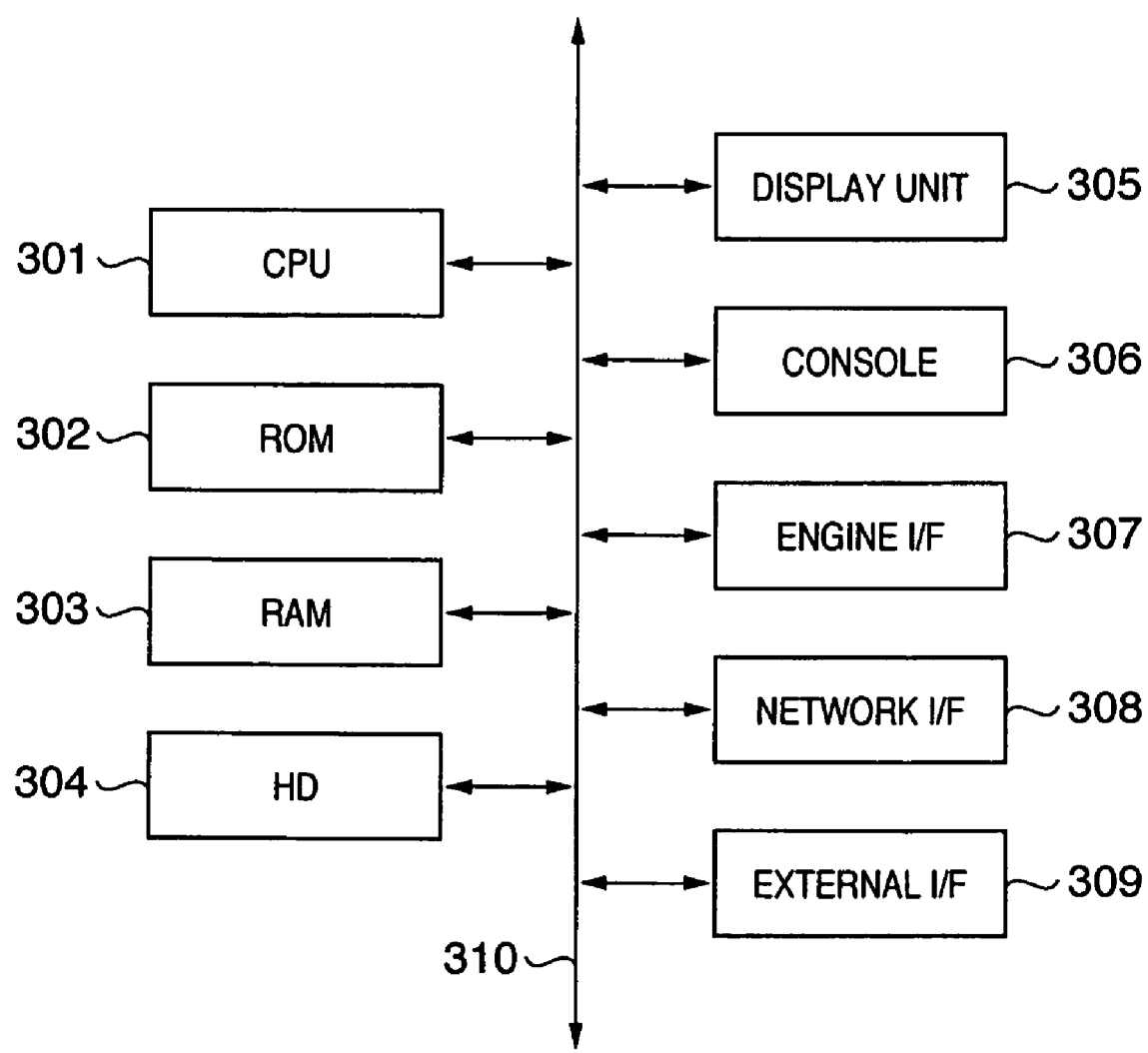
FIG. 4 is a block diagram showing the arrangement of an MFP.

FIG. 4 is a block diagram showing the arrangement of the MFP.

Referring to FIG. 4, a CPU 301 controls the overall MFP via a system bus 310 using a RAM 303 as a work memory, and executes various kinds of processing to be described later based on programs and data stored in a ROM 302.

The ROM 302 stores a system activation program, a program for controlling a printer engine, text data, character code information, and the like. The RAM 303 stores font data which are additionally registered by downloading, and loads programs and data for respective processes. The RAM 303 is also used as a data storage area of externally received image data. A storage unit (HD) 304 such as a hard disk or the like is used to spool data and to store programs and information files, image data, attribute signals, and the like, and is also used as a work area of the CPU 301.

A display unit 305 comprising, e.g., a liquid crystal panel or the like displays the setting state of the MFP, the current internal processing of the MFP, the error state, and the like. A console 306 which comprises keys, buttons, a touch panel, and the like is used to set, change settings, reset, and so forth of the MFP by the user. The display unit 305 and console 306 can also display an operation dialog used to select a processing mode upon outputting, as will be described later.

An engine interface (I/F) 307 is an interface which exchanges control commands, status data, and the like with a printer engine. A network interface (I/F) 308 is an interface which connects the MFP to a local area network (LAN) or the like. An external interface (I/F) 309 is a serial bus interface such as USB (Universal Serial Bus), IEEE1394, or the like, and is used to exchange data with, e.g., a host computer.

[Processing of Drawing Command]

Figure 5:
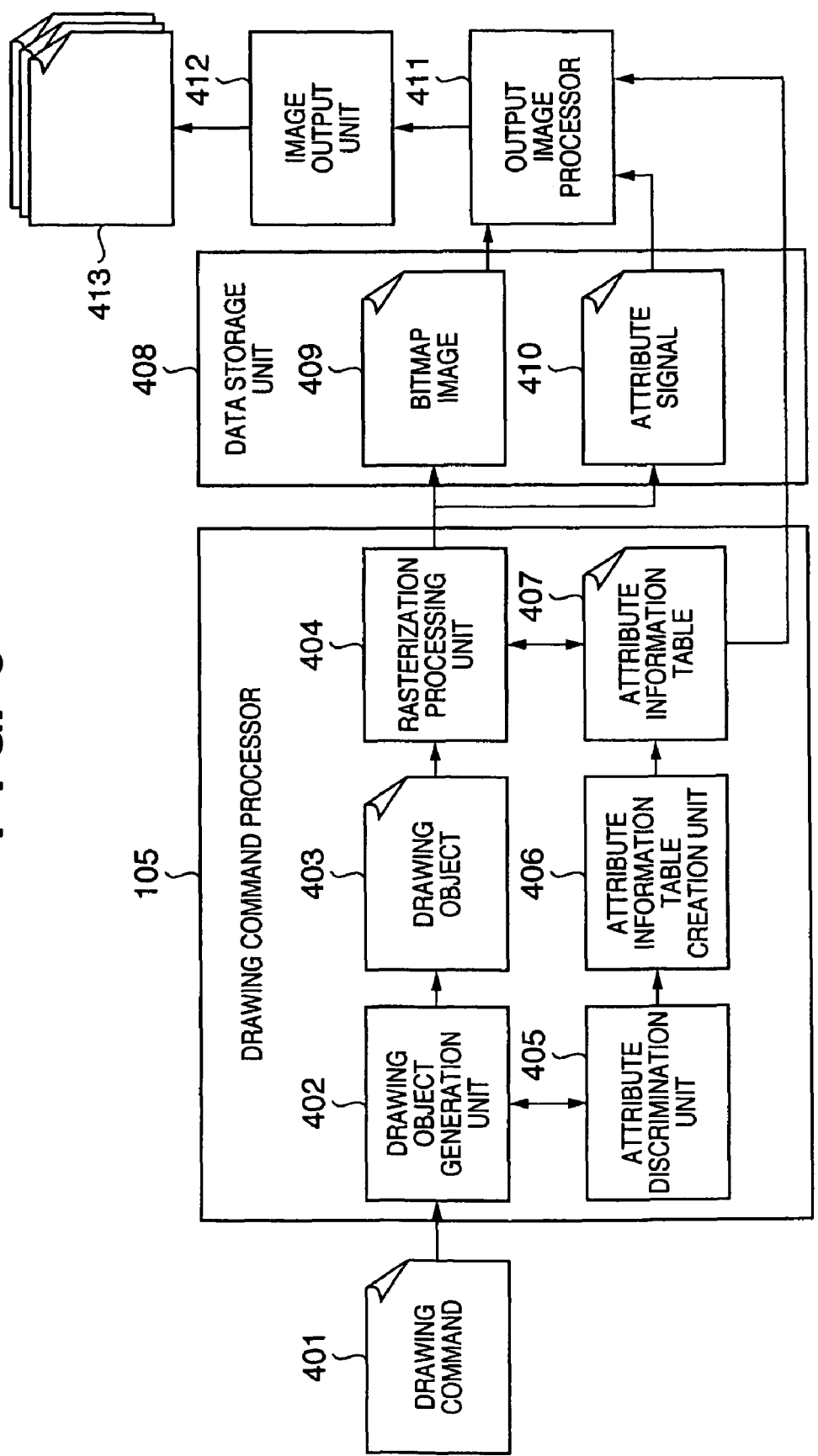
FIG. 5 is a block diagram showing an overview of the functional arrangement implemented by controller software of the MFP.

FIG. 5 is a block diagram showing an overview of the functional arrangement implemented by controller software of the MFP. Processing for converting a drawing command received from a host computer into bitmap image data, and printing the bitmap image data onto a sheet surface will be described below using FIG. 5.

A drawing command 401 received from the host computer by the MFP is input to a drawing command processor 105. A drawing object generation unit 402 of the drawing command processor 105 interprets the drawing command 401 to generate drawing objects 403. An attribute discrimination unit 405 discriminates image characteristics upon execution of the interpretation processing of the drawing object generation unit 402 to discriminate the types of attribute regions included in the drawing command 401, and counts the number of types.

Configuration of Drawing Command

Figure 6:
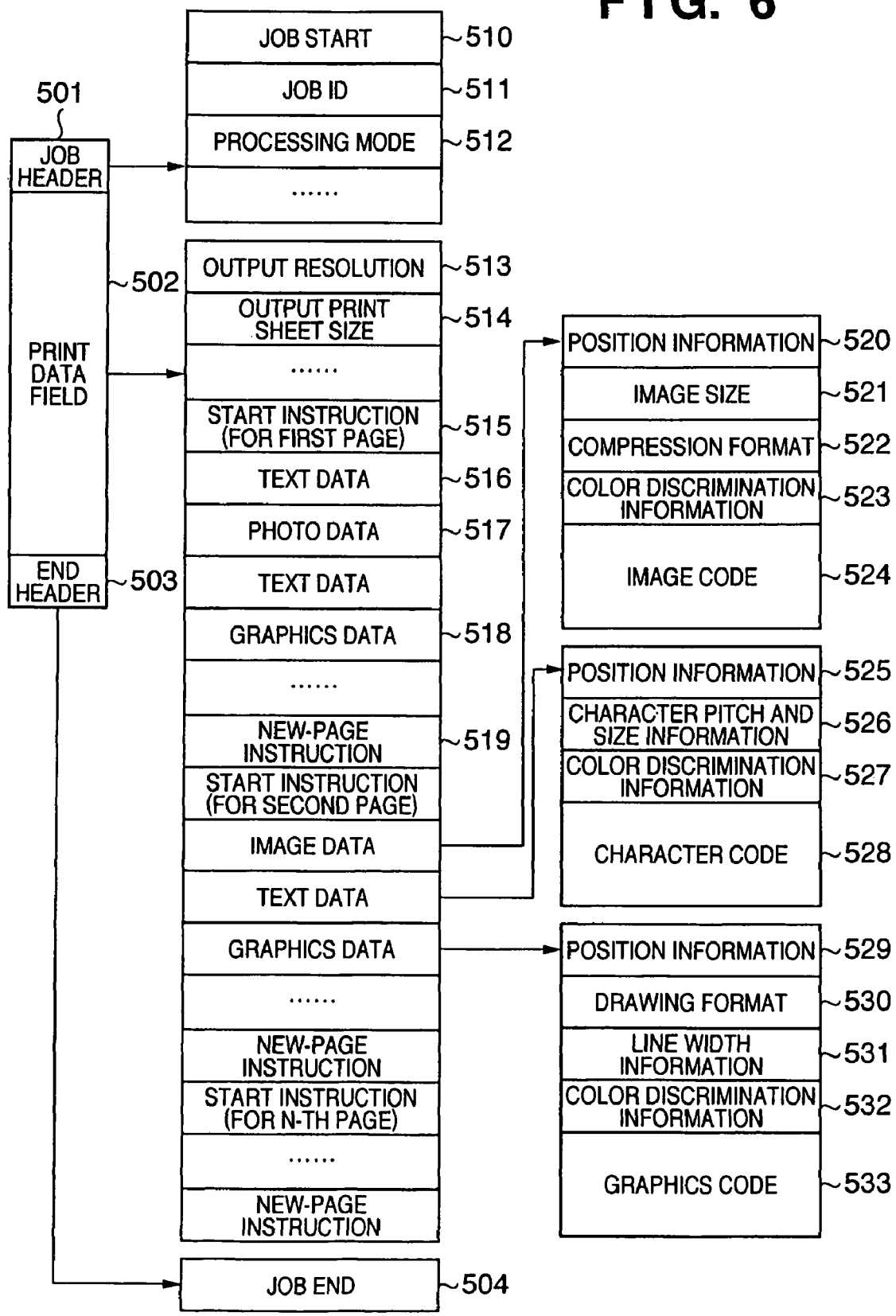
FIG. 6 shows the configuration of a drawing command.

FIG. 6 shows an example of the configuration of a drawing command.

FIG. 6 shows the configuration of a drawing command in which the number of output pages is N, and the drawing command has a job header 501, print data field 502, and end header 503. The job header 501 includes information such as job start information 510, a job ID 511, a processing mode 512 to be applied to the job, and the like. The print data field 502 includes instructions and data such as a start instruction 515, text data 516, photo data 517, graphics data 518, new page instruction 519, and the like of each page together with information common to respective pages such as an output resolution 513, output print sheet size 514, and the like. The end header 503 includes job end information 504 of that job.

The photo data 517 has position information 520, an image size 521, a compression format 522, color discrimination information 523, and an image code 524. The text data 516 has position information 525, character pitch and size information 526, color discrimination information 527, and a character code 528. The graphics data 518 has position information 529, a drawing format 530, line width information 531, color discrimination information 532, and a graphics code 533.

The attribute discrimination unit 405 creates a table which is used in processing and describes all attribute regions. Note that all the attribute regions are set in advance as information unique to the image processing apparatus. The attribute discrimination unit 405 discriminates the types of attribute regions included in the drawing command 401 upon generation of the drawing objects 403 by the drawing object generation unit 402, and counts the number of types of attribute regions included in that drawing command.

Attribute Discrimination Table

FIG. 7 shows a practical example of the table created by the attribute discrimination unit 405.

Attributes indicated by an attribute column shown in FIG. 7 correspond to all the attribute regions set in the MFP of this embodiment, and 4-bit attribute signals are defined in correspondence with respective attribute regions. The attribute discrimination unit 405 discriminates the types of attribute regions included in the drawing command upon generation of the drawing objects 403.

Since a drawing command to be described in the column of data 1 shown in FIG. 7 includes the photo data 517 which has the color discrimination information 523="not apply 100% UCR", it is discriminated that a photographic attribute region exists. Note that a symbol o shown in FIG. 7 indicates a discrimination result "exist" and a symbol x indicates a discrimination result "not exist".

Also, the graphics data 518 having the drawing format 530="not apply line drawing" exists, and the color discrimination information 532 includes both "apply 100% UCR" and "not apply 100% UCR". Therefore, it is discriminated that both a graphical attribute region and graphical and gray attribute region exist.

The text data 516 having the character size information 526 that indicates both sizes equal to or larger than and equal to or smaller than the predetermined size exists, and the color discrimination information 527 of characters of both the sizes indicates "apply 100% UCR". Therefore, it is discriminated that a text and gray attribute region and small letter and gray attribute region exist.

Also, the graphics data 518 which includes the drawing format 530="apply line drawing" exists, and also includes the line width information 531 indicating a predetermined line width or more, and the color discrimination information 532 indicating "apply 100% UCR". Therefore, it is discriminated that a line drawing and gray attribute region exists.

In this way, by checking the existence of all the attribute regions for data 1 of the drawing command, the attribute regions included in data 1 are discriminated, and the number (a total shown in FIG. 7) of types of attribute regions is counted. Note that six different attribute regions exist in case of data 1.

In some cases, a drawing command may include only one attribute region. Data 2 shown in FIG. 7 indicates such example, and only the photo data 517 indicating "not apply 100% UCR" exists. Therefore, the count value of the number of types of attribute regions is "1".

After the attribute regions included in the drawing command are discriminated by the attribute discrimination unit 405, the attribute information table creation unit 406 creates an attribute information table 407 corresponding to the attribute regions included in the drawing command, and defines attribute signals. Note that the number of bits of each attribute signal is determined depending on the number of types of attribute regions counted by the attribute discrimination unit 405. Let N be the number of types of attribute regions, and M be the number of bits of each attribute signal. Then, we have:

$$2^{M-1} < N \leq 2^M \quad (1)$$

That is, when it is discriminated that the number of types of attribute regions is 6, each attribute signal is expressed by 3 bits; when it is discriminated that the number of types of attribute regions is 1, it is expressed by 1 bit. After the number of bits of each attribute signal is determined, attribute signals are newly defined to create an attribute information table 407.

FIGS. 8 and 9 show practical examples of a table created by the attribute information table creation unit 406. FIG. 8 shows an attribute information table created for data 1 shown in FIG. 7, and FIG. 9 shows an attribute information table created for data 2.

Six different attribute regions are included in data 1, as indicated by an attribute column in FIG. 8, and these attribute regions are newly defined by 3-bit attribute signals. One attribute region is included in data 2, as shown in FIG. 9, and it is newly defined by a 1-bit attribute signal.

Referring back to FIG. 5, a rasterization processing unit 404 rasterizes the drawing object 403. Then, the rasterization processing unit 404 generates attribute signals 410 indicating attribute information of respective pixels of a bitmap image 409 with reference to the bitmap image 409 and the attribute information table 407. Then, the rasterization processing unit 404 stores the bitmap image and attribute signals in a data storage unit 408 which comprises the RAM 303 and HD 304. Note that the attribute signals 410 are those which are newly defined by the attribute information table creation unit 406.

Next, an output image processor 411 applies image processing such as color conversion processing, pseudo halftone processing, and the like to the bitmap image 409. In this case, the output image processor 411 switches an LUT for the color conversion processing and a dither matrix for the pseudo halftone processing with reference to the attribute information table 407 and attribute signals 410 in accordance with an attribute region that includes an interest pixel. That is, the output image processor 411 converts the 3-bit attribute signal 410 into a 4-bit attribute signal used by itself using the attribute information table shown in, e.g., FIG. 8. The output image processor 411 can discriminate whether or not 100% UCR processing is to be applied in the color conversion processing with reference to, e.g., bit 0 (gray bit shown in. FIG. 3) of the converted attribute signal.

An image output unit 412 applies output processing to the bitmap image which has undergone the image processing according to the attribute signals 410, and prints an image on a print sheet 413 based on the drawing command received from the host computer.

[Generation and Use of Attribute Signal]

Figure 10:
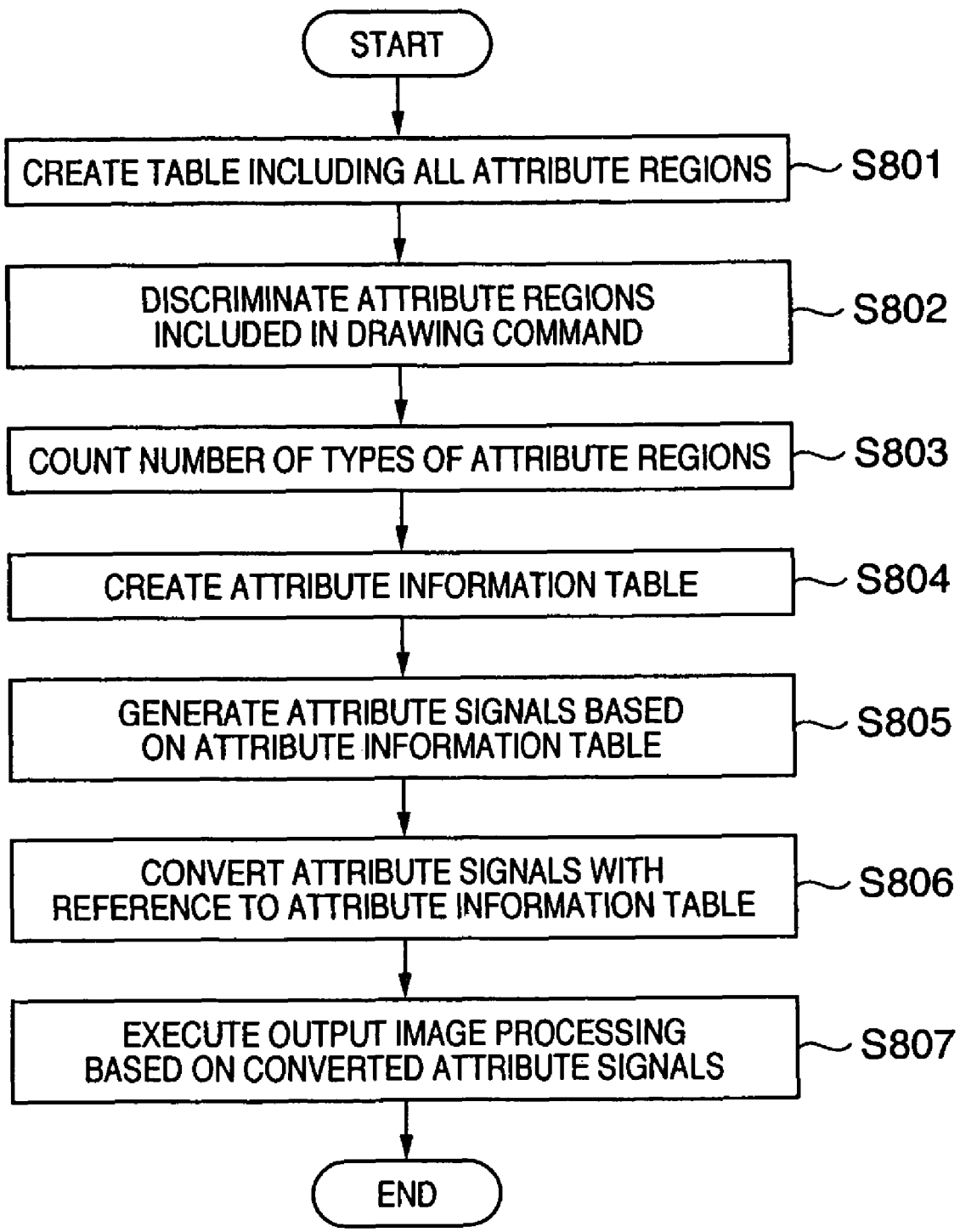
FIG. 10 is a flowchart showing the processing associated with generation and use of attribute signals.

FIG. 10 is a flowchart showing the processing associated with generation and use of attribute signal. This processing is executed by the CPU 301.

A table (FIG. 7) which includes all the attribute regions is created based on information unique to the image processing apparatus (S801), attribute regions included in the drawing command are discriminated upon generation of drawing objects (S802), and the number of types of attribute regions included in the drawing command is counted (S803).

The number of bits of a new attribute signal to be defined is determined based on the number of types of attribute regions (inequality (1)), and the attribute information table 407 (e.g., FIG. 8 or 9) which indicates the correspondence between the attribute signals (FIG. 7) and those corresponding to the attribute regions included in the drawing command is created (S804).

Next, parallel to processing for generating the bitmap image 409 by rendering the drawing objects 403, attribute signals 410 for respective pixels are generated based on the attribute information table 407, and are stored in the data storage unit 408 (S805). When the data storage unit 408 requests data storage in a byte unit, a plurality of attribute signals are combined and data is stored in a byte unit.

The attribute signals 410 are converted into those, which are to be used by the output image processor 411, with reference to the attribute information table 407 (S806), and output image processing is executed based on the converted attribute signals (S807).

As described above, according to the first embodiment, in the image processing apparatus which improves the print image quality by switching image processing based on attribute information, the attribute signals 410 are defined in accordance with the number of types of attribute regions included in image data to be processed. Therefore, the attribute signals 410 can be defined to have the number of bits corresponding to the number of types of attribute regions included in the image data to be processed. As a result, the memory use amount of the data storage unit 408 that stores the attribute signals 410 can be reduced as much as possible according to the number of types of attribute regions.

Second Embodiment

Image processing according to the second embodiment of the present invention will be described hereinafter. The same reference numerals in the second embodiment denote the same parts as in the first embodiment, and a detailed description thereof will be omitted.

In the first embodiment, the number of types of attribute regions included in a drawing command is counted, and an attribute signal is defined in accordance with the number of types of attribute regions. The number of types of attribute regions can be determined upon generation of the drawing command. The image processing apparatus normally has a function of selecting a processing mode according to the purpose of printing such as text priority, photo priority, graphics priority, their combinations, and the like. In the second embodiment, the types of attribute regions to be used are prescribed in advance according to the processing mode that reflects the purpose of printing, and an attribute signal is defined based on the number of prescribed types of attribute regions.

Figure 11:
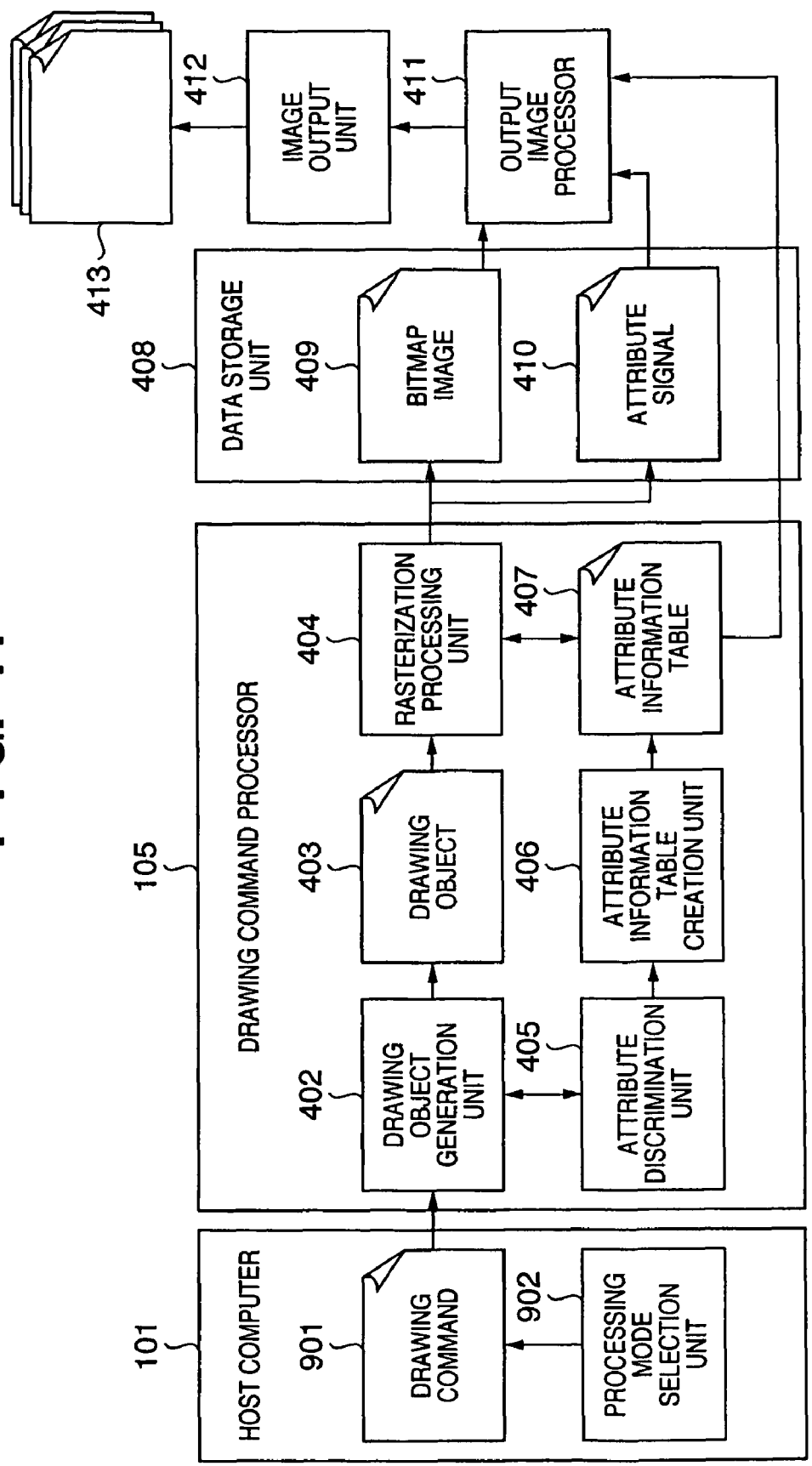
FIG. 11 is a block diagram showing an overview of the functional arrangement implemented by controller software of the MFP according to the second embodiment.

FIG. 11 is a block diagram showing an overview of the functional arrangement implemented by controller software of the MFP according to the second embodiment.

Referring to FIG. 11, the user of the host computer 101 can select the purpose of printing using a processing mode selection unit 902 provided by, e.g., a printer driver. The printer driver generates a drawing command 901 including drawing objects of attribute regions prescribed in accordance with the selected processing mode. Information indicating the selected processing mode is held in the processing mode 512 in the job header 501 of the drawing command 901 (see FIG. 6). The drawing command 901 generated in this way is input to the drawing command processor 105.

The attribute discrimination unit 405 creates a table that describes all the attribute regions used in processing as in the first embodiment. FIG. 12 shows a practical example of the table created by the attribute discrimination unit 405.

Next, the attribute discrimination unit 405 reads out the selected processing mode from the processing mode 512 in the drawing command 901, and discriminates the types of attribute regions.

In case of a drawing command to be described in the column of processing mode 1 shown in FIG. 12 (in other words, a drawing command 901 generated when processing mode 1 is selected), there may exist four types of attribute regions, i.e., a photographic attribute region, graphical attribute region, textual attribute region, and line drawing and gray attribute region. Therefore, the number of types of attribute regions is "4".

In a drawing command 901 generated upon selection of processing mode 2, there may exist the following seven types of attribute regions: a photographic attribute region, graphical attribute region, graphical and gray attribute region, textual and gray attribute region, line drawing and gray attribute region, small letter and gray attribute region, and fine line and gray attribute region.

Note that the processing mode including many types of attribute regions normally aims at high image quality since image processes can be switched in detail. On the other hand, the processing mode including a small number of types of attribute regions normally aims at high-speed printing since such mode often allows high-speed processing due to a small number of segmentations of image processing.

The attribute information table creation unit 406 creates the attribute information table 407 corresponding to attribute regions included in the drawing command and defines an attribute signal after the attribute discrimination unit 405 discriminates the attribute regions included in the drawing command. Since processing mode 1 can include the four types of attribute regions, a new attribute signal to be defined is expressed by 2 bits. On the other hand, since processing mode 2 can include the seven types of attribute regions, a new attribute signal to be defined is expressed by 3 bits.

As described above, according to the second embodiment, an attribute signal can be defined by an appropriate number of bits based on the processing mode included in the drawing command without counting the number of types of attribute regions. Therefore, the processing for defining the attribute signal can become simpler than in the first embodiment, and the processing load on the CPU 301 can be reduced.

Third Embodiment

Image processing according to the third embodiment of the present invention will be described hereinafter. The same reference numerals in the third embodiment denote the same parts as in the first and second embodiments, and a detailed description thereof will be omitted.

In the third embodiment, an attribute signal is defined by combining the methods described in the first and second embodiments. That is, whether or not the method of defining an attribute signal based on attribute regions according to the selected processing mode, which has been described in the second embodiment, is adopted is determined. If the method of the second embodiment is not adopted, the method of defining an attribute signal by counting the number of types of attribute regions included in the drawing command, which has been described in the first embodiment, is adopted.

The printer driver generates a drawing command according to the processing mode selected by the processing mode selection unit 902. In the third embodiment, however, a drawing command including only prescribed attribute regions is generated in a given processing mode, but a drawing command is generated in another processing mode without prescribing the types of attribute regions. Note that information indicating the selected processing mode, and information indicating whether or not attribute regions are prescribed are held in the processing mode 512 in the Job header 501 in the drawing command (see FIG. 6) as in the second embodiment. The drawing command 901 generated in this way is input to the drawing command processor 105.

The attribute discrimination unit 405 creates a table that describes all the attribute regions used in processing as in the first and second embodiments. Next, the attribute discrimination unit 405 reads out the selected processing mode and the information indicating whether or not attribute regions are prescribed from the processing mode 512 in the drawing command 901. If the attribute regions are prescribed, an attribute signal is defined as in the second embodiment. On the other hand, if the attribute regions are not prescribed, an attribute signal is defined as in the first embodiment.

Note that the processing mode in which no attribute regions are prescribed normally corresponds to a processing mode that aims at high image quality since the types of attribute regions are not limited and image processes can be switched in detail. On the other hand, the processing mode in which attribute regions are prescribed normally corresponds to a processing mode that aims at high-speed printing since it can control division of image processing and allows high-speed processing.

As described above, according to the third embodiment, the processing mode in which attribute regions are prescribed, and that in which no attribute regions are prescribed can be coped with.

Fourth Embodiment

Image processing according to the fourth embodiment of the present invention will be described hereinafter. The same reference numerals in the fourth embodiment denote the same parts as in the first to third embodiments, and a detailed description thereof will be omitted.

In the example of the above description, the types of attribute regions included in a drawing command are prescribed in accordance with selection of a processing mode. However, the types of attribute regions are prescribed in correspondence with the processing mode, while the types of attribute regions included in the drawing command are prescribed but the image processing apparatus which receives the drawing command may limit the types of attribute regions to the prescribed types of attribute regions.

More specifically, the printer driver generates a drawing command with reference to a processing mode selected by the processing mode selection unit 902. In the fourth embodiment, a drawing command is generated without prescribing types of attribute regions irrespective of the processing mode. The number of types of attribute regions is prescribed in a given processing mode (not to prescribe the types of attribute regions included in the drawing command), but even the number of types of attribute regions is not prescribed in another processing mode. Note that information of the selected processing mode and information that specifies the number of types of attribute regions are held in the processing mode 512 in the job header 501 in the drawing command (see FIG. 6). The drawing command 901 generated in this way is input to the drawing command processor 105.

The attribute discrimination unit 405 creates a table that describes all the attribute regions used in processing as in the first to third embodiments. Next, the attribute discrimination unit 405 reads out the selected processing mode and the information indicating whether or not the number of types of attribute regions is prescribed from the processing mode 512 in the drawing command 901. If the number of types of attribute regions is not prescribed, an attribute signal is defined as in the first embodiment.

On the other hand, if the number of types of attribute regions is prescribed, the attribute discrimination unit 405 discriminates attribute regions included in the drawing command 901 upon generation of the drawing objects 403, and counts the number of types of attribute regions. Furthermore, the attribute discrimination unit 405 counts the number of pixels corresponding to the number of types of attribute regions after the bitmap image is rendered. If the number of types of attribute regions included in the drawing command exceeds the prescribed number, the attribute discrimination unit 405 executes processing for limiting the types of attribute regions based on the calculated number of pixels, so that the number of types of attribute regions falls within the prescribed number range.

The method of calculating the number of pixels by the attribute discrimination unit 405 is as follows. If a drawing object is image data, the number of pixels after rendering is calculated based on the image size 521 shown in FIG. 6. On the other hand, if a drawing object is text data, the number of pixels after rendering is calculated based on the character pitch and size information 526. The calculation method in case of graphics data will be described below using FIG. 13.

Figure 13:
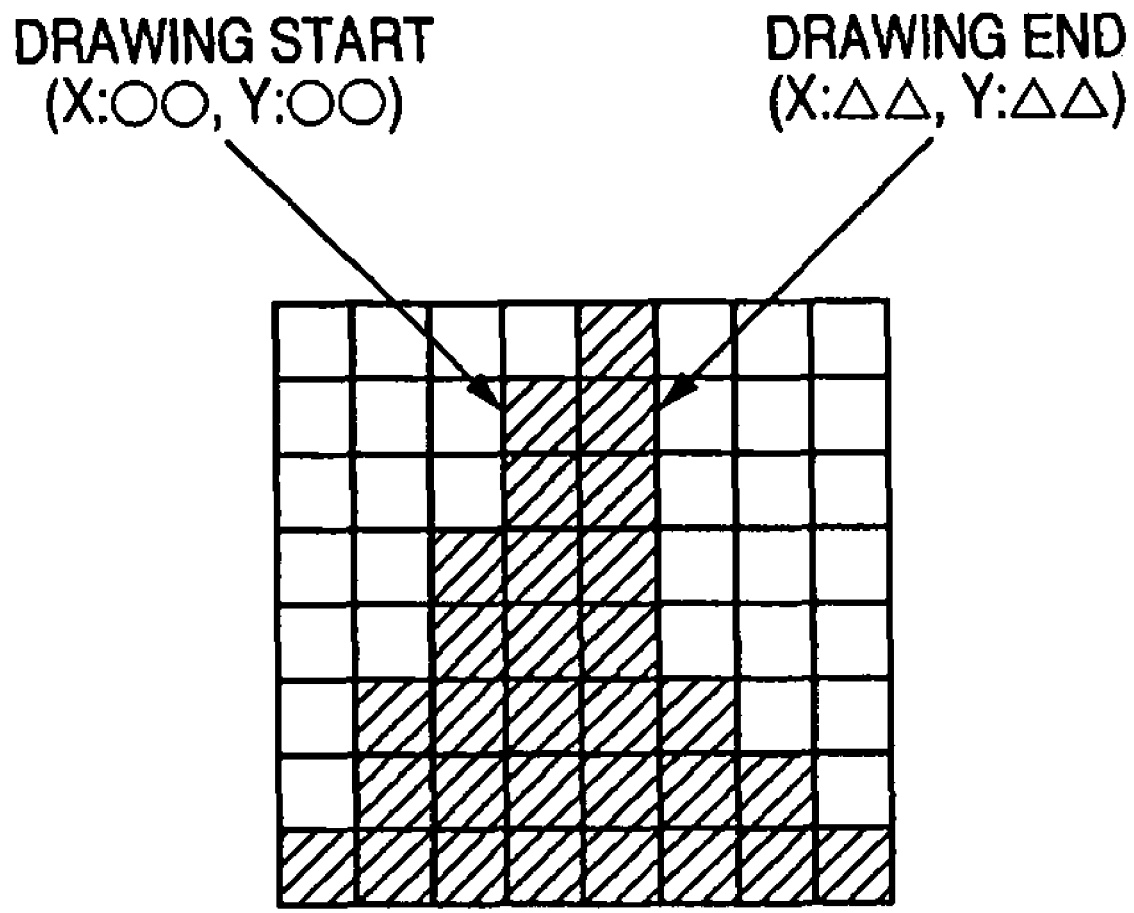
FIG. 13 shows an example of the drawing contents based on a graphics code.

FIG. 13 shows an example of the drawing contents based on the graphics code 533. In FIG. 13, each pixel indicated by an open square indicates the one which is not drawn, and each pixel indicated by a full square indicates the one which is to be drawn based on the graphics code 533. Upon making such drawing, the graphics code 533 includes the X- and Y-coordinates of the drawing start position and those of the drawing end position in each scan line. The attribute discrimination unit 405 calculates the number of pixels based on the coordinate values indicating the drawing start position and the drawing end position included in the graphics code 533 upon calculating the number of pixels of the graphics data.

Processing for limiting the types of attribute regions will be described below.

When the number of types of attribute regions exceeds the prescribed number, the types of attribute regions are sorted in descending order of the number of pixels, and the types within the prescribed number are selected from the top. Attribute regions falling outside the prescribed number are associated with those falling within the prescribed number in accordance with the priority order of bits of attribute signals, as will be described in detail later.

FIG. 14 shows a practical example of a table created by the attribute discrimination unit 405 of the fourth embodiment.

The attribute column shown in FIG. 14 indicates all attribute regions set for the MFP of this embodiment, and a 4-bit attribute signal is defined in correspondence with each attribute region.

In FIG. 14, processing mode 1 is the one in which the number of types of attribute regions is not prescribed, and an attribute signal is defined by the method of the first embodiment. Processing modes 2 and 3 are those in which the number of types of attribute regions is prescribed. Note that the numbers of types of attribute regions are prescribed in both processing modes 2 and 3 are four (2 bits).

In processing modes 2 and 3, the types of attribute regions included in the drawing command are discriminated, and the number of pixels corresponding to each type of attribute region is calculated by the aforementioned method. Numeral values described in the columns of processing modes 2 and 3 in FIG. 14 indicate the numbers of pixels. For example, 39584 pixels exist in an image attribute region in processing mode 2, and 256 pixels exist in an image attribute region in processing mode 3. Note that drawing commands 901 input in processing modes 2 and 3 are different from each other.

In this way, the types of attribute regions are discriminated, and the numbers of pixels of these attribute regions are calculated in accordance with each processing mode. A drawing command 901 of processing mode 1 includes six types of attribute regions, and a drawing command 902 of processing mode 2 or 3 includes seven types of attribute regions.

For processing mode 1 in which the number of types of attribute regions is not prescribed, the attribute information table 407 shown in FIG. 15 is created as in the first embodiment. Since the drawing command 901 includes six types of attribute regions, a new attribute signal to be defined is expressed by 3 bits.

On the other hand, in processing modes 2 and 3 in which the number of types of attribute regions is prescribed, the number of types of attribute regions included in the drawing command 901 is compared with the prescribed number. In either processing mode in FIG. 14, the number "7" of types of attribute regions included in the drawing command 901 exceeds the prescribed number "4". Therefore, the processing for limiting the number of types of attribute regions is executed.

Figure 16:
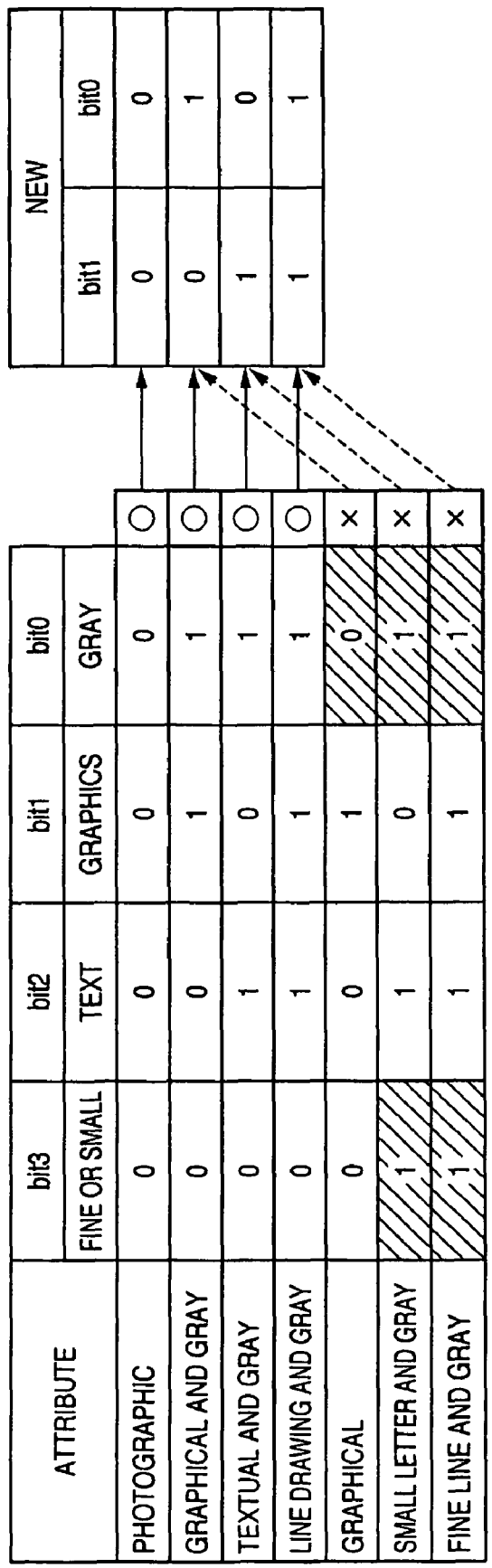
FIG. 16 is a view for explaining processing for rounding the number of types of attribute regions in processing mode 2.

FIG. 16 is a view for explaining the processing for limiting the number of types of attribute regions in processing mode 2.

In processing mode 2, the priority order of bits of attribute signals used in the limiting processing is determined in advance as shown in FIG. 14. The limiting processing is executed according to this priority order.

The attribute information table 407 is created for the types of attribute regions (including larger numbers of pixels) which fall within the prescribed value "4" in the drawing command in processing mode 2, as in the first embodiment. Since the prescribed number is "4", a new attribute signal to be defined is expressed by 2 bits.

For the top four types of attribute regions including the larger numbers of pixels of those which are included in the drawing command, correspondence between the definitions of default attribute signals used by the output image processor 411 and those of new attribute signals to be generated is described as follows:

Photographic attribute region: 0000→00
Graphical and gray attribute region: 0011→01
Textual and gray attribute region: 0101→10
Line drawing and gray attribute region: 0111→11

As for attribute regions other than the top four types, processing for limiting the number of types of attribute regions is executed in accordance with the priority order of attribute signals in processing mode 2 shown in FIG. 14.

The priority order of attribute signals in processing mode 2 is the top priority bit=bit 1 (graphics bit)→the second top priority bit=bit 2 (text bit)→the third top priority bit=bit 3 (fine or small bit)→the lowest priority bit=bit 0 (gray bit). Therefore, by referring to bits 1 to 3 of a default attribute signal '0010' of the graphical attribute region, '001*' is obtained. In the top four types of attribute regions, an attribute region having a default attribute signal that matches '001*' is the graphical and gray attribute region which has an attribute signal '0011'. Hence, the graphical attribute region is associated with the graphical and gray attribute region.

By referring to bits 1 to 3 of a default attribute signal '1101' of the small letter and gray attribute region, '110*' is obtained. However, since no attribute region having a default attribute signal that matches '110*' exists, bits 1 and 2 are referred to by excluding bit 3 which has the second lowest priority in addition to bit 0. In this case, since '*10*' is obtained, an attribute region which has a default attribute signal that matches '*10*' is the textual and gray attribute region having an attribute signal '0101', in the top four types of attribute regions. Hence, the small letter and gray attribute region is associated with the textual and gray attribute region.

Since no matched attribute region is obtained by referring to bits 1 to 3 of the fine line and gray attribute region, '*11*' is obtained by referring to bits 1 and 2. An attribute region that matches this is the line drawing and gray attribute region having an attribute signal '0111'. Hence, the small letter and gray attribute region is associated with the line drawing and gray attribute region.

That is, for the graphical attribute region, small letter and gray attribute region, and fine line and gray attribute region, attribute signals are defined as follows:

Graphical attribute region: 01 (associated with the graphical and gray attribute region)
Small letter and gray attribute region: 10 (associated with the textual and gray attribute region)
Fine line and gray attribute region: 11 (associated with the line drawing and gray attribute region)

The priority order of bits of the attribute signals used in the limiting processing can be changed according to the processing mode. The priority order of attribute signals in processing mode 3 is the top priority bit=bit 2 (text bit)→the second top priority bit=bit 3 (fine or small bit)→the third top priority bit=bit 1 (graphics bit)→the lowest priority bit=bit 0 (gray bit), as shown in FIG. 14.

Figure 17:
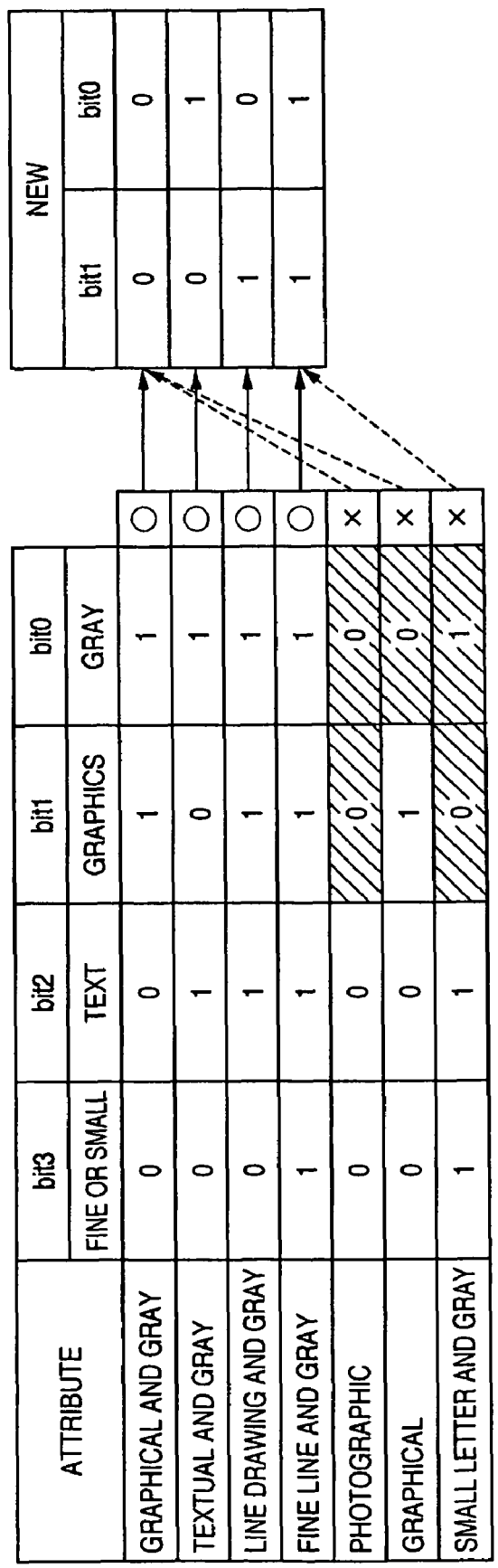
FIG. 17 is a view for explaining processing for rounding the number of types of attribute regions in processing mode 3.

FIG. 17 is a view for explaining the processing for limiting the number of types of attribute regions in processing mode 3.

The attribute information table 407 is created for the types of attribute regions (including larger numbers of pixels) which fall within the prescribed value "4" in the drawing command in processing mode 3, as in the first embodiment. Since the prescribed number is "4", a new attribute signal to be defined is expressed by 2 bits.

As shown in FIG. 17, for the top four types of attribute regions including the larger numbers of pixels of those which are included in the drawing command, correspondence between the definitions of default attribute signals and those of new attribute signals to be generated is described as follows:

Graphical and gray attribute region: 0011→00
Textual and gray attribute region: 0101→01
Line drawing and gray attribute region: 0111→10
Fine line and gray attribute region: 1111→11

As for attribute regions other than the top four types, the processing for limiting the number of types of attribute regions is executed in accordance with the priority order of attribute signals in processing mode 3 shown in FIG. 14.

The priority order of attribute signals in processing mode 3 is the top priority bit=bit 2 (text bit)→the second top priority bit=bit 3 (fine or small bit)→the third top priority bit=bit 1 (graphics bit)→the lowest priority bit=bit 0 (gray bit). Therefore, by referring to bits 1 to 3 of a default attribute signal '0000' of the photographic attribute region, '000*' is obtained. However, since there is no matched attribute region, bits 2 and 3 are referred to. The graphical and gray attribute region has a default attribute signal '0011' which matches '00**'. Hence, the photographic attribute region is associated with the graphical and gray attribute region.

By referring to bits 1 to 3 of a default attribute signal '0010' of the graphical attribute region, '001*' is obtained, and the graphical and gray attribute region has a default attribute signal '0011' that matches '001*'. Hence, the graphical attribute region is associated with the graphical and gray attribute region.

Also, since no matched attribute region is obtained by referring to bits 1 to 3 of the small letter and gray attribute region, '11' is obtained by referring to bits 2 and 3. The fine line and gray attribute region having a default attribute signal '1111' matches this '11'. Hence, the small letter and gray attribute region is associated with the fine line and gray attribute region.

That is, for the photographic attribute region, graphical attribute region, and small letter and gray attribute region, attribute signals are defined as follows:

Photographic attribute region: 00 (associated with the graphical and gray attribute region)
Graphical attribute region: 00 (associated with the graphical and gray attribute region)
Small letter and gray attribute region: 11 (associated with the fine line and gray attribute region)

As for the limited attribute regions, the image processing is applied without converting them into the types of attribute regions upon input, i.e., the original types of attribute regions. The output image processor 411 converts the attribute signal '01' of the graphical and gray attribute region into a default attribute signal '0011' using the attribute information table 407 shown in, e.g., FIG. 16. Therefore, the graphical and gray attribute region undergoes image processing as the graphical and gray attribute region. On the other hand, the attribute signal of the limited graphical attribute region is never converted into a default attribute signal '0010'. Therefore, the graphical attribute region undergoes image processing as the graphical and gray attribute region.

In the above matching, an attribute signal of the attribute region to be limited, from which bits are extracted in the priority order, is likely to match those of a plurality of attribute regions. In this case, it is indifferent about which of attribute regions is to be associated with. For example, an attribute region including a largest number of pixels of those which have matched attribute signals may be associated with.

When the number of types of attribute regions is prescribed depending on the processing mode, while the number of types of attribute regions included in the drawing command is not prescribed, the processing mode can be selected not only by the host computer 101 but also by the MFP side. That is, the processing mode may be selected using the console 306 and display unit 305, and the types of attribute regions included in the received drawing command may be limited to the number according to the processing mode selected on the MFP side.

Figure 18:
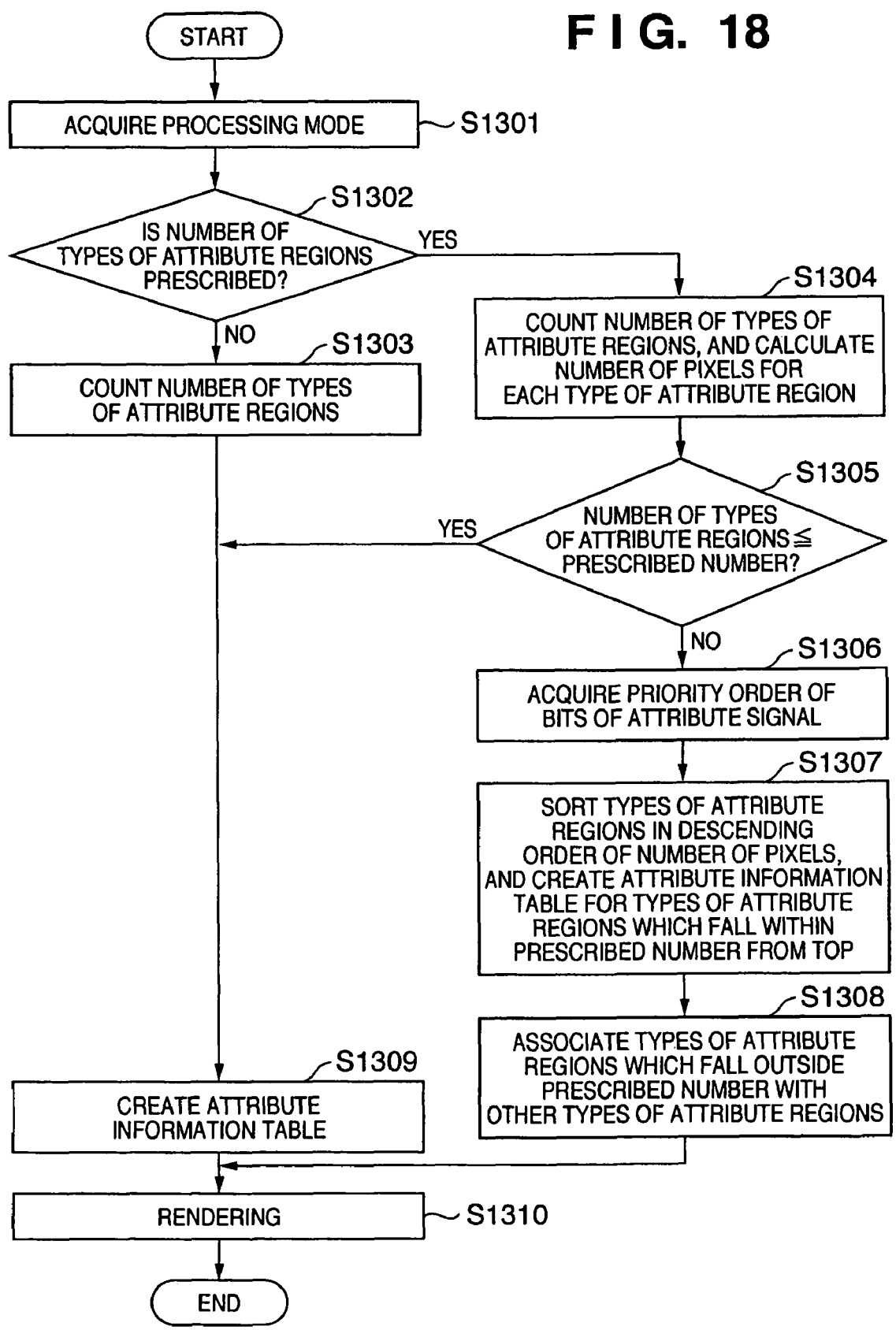
FIG. 18 is a flowchart showing the processing associated with generation and use of attribute signals.

FIG. 18 is a flowchart showing the processing associated with generation and use of attribute signals according to the fourth embodiment. This processing is executed by the CPU 301.

The processing mode 512 in the job header 501 is acquired (S1301), and it is checked based on the acquired processing mode 512 if the number of types of attribute regions is prescribed (S1302). If the number of types of attribute regions is not prescribed, the number of types of attribute regions included in the drawing command is counted (S1303), and the number of bits of an attribute signal is determined based on the number of types of attribute regions, thus creating the attribute information table 407 (S1309).

On the other hand, if the number of types of attribute regions is prescribed, the number of types of attribute regions is counted, and the numbers of pixels are calculated for respective types of attribute regions (S1304). It is checked if the number of types of attribute regions is equal to or smaller than the prescribed value (S1305), and the number of bits of an attribute signal is discriminated based on the number of types of attribute regions, thus creating the attribute information table 407 (S1309).

If the number of types of attribute regions exceeds the prescribed value, the priority order of bits of an attribute signal corresponding to the processing mode is acquired (S1306). For the types of attribute regions which fall within the prescribed number by sorting the types of attribute regions in descending order of the number of pixels, the attribute information table 407 of the number of bits corresponding to the prescribed number is created (S1307). After that, for the types of attribute regions which have the smaller numbers of pixels and fall outside the prescribed number, the aforementioned associating processing is done based on the priority order of bits of an attribute signal, thus completing the attribute information table 407 (S1308).

Then, rendering is done to generate the attribute signals 410 (S1310).

As described above, according to the fourth embodiment, the case wherein the types of attribute regions are prescribed in correspondence with the processing mode, while the types of attribute regions included in the drawing command, can be coped with.

Fifth Embodiment

Image processing according to the fifth embodiment of the present invention will be described hereinafter. The same reference numerals in the fifth embodiment denote the same parts as in the first to fourth embodiments, and a detailed description thereof will be omitted.

In the fourth embodiment, the attribute signals 410 generated by rendering are those of the fixed length described in the attribute information table 407. However, when the numbers of pixels for respective types of attribute regions are known, the data sizes of the attribute signals can be reduced by adopting variable-length attribute signals. The fifth embodiment will exemplify a case wherein variable-length attribute signals are generated using an encoding method which is used generally.

In the fifth embodiment, the attribute discrimination unit 405 calculates the numbers of pixels for respective types of attribute regions after rendering to the bitmap image upon generation of drawing objects, as in the fourth embodiment. Note that the method of calculating the number of pixels is the same as that in the fourth embodiment.

In the fifth embodiment, the number of bits of a new attribute signal to be defined is determined based on the frequencies of occurrence of the types of attribute regions in place of the number of types of attribute regions included in the drawing command.

Figure 20:
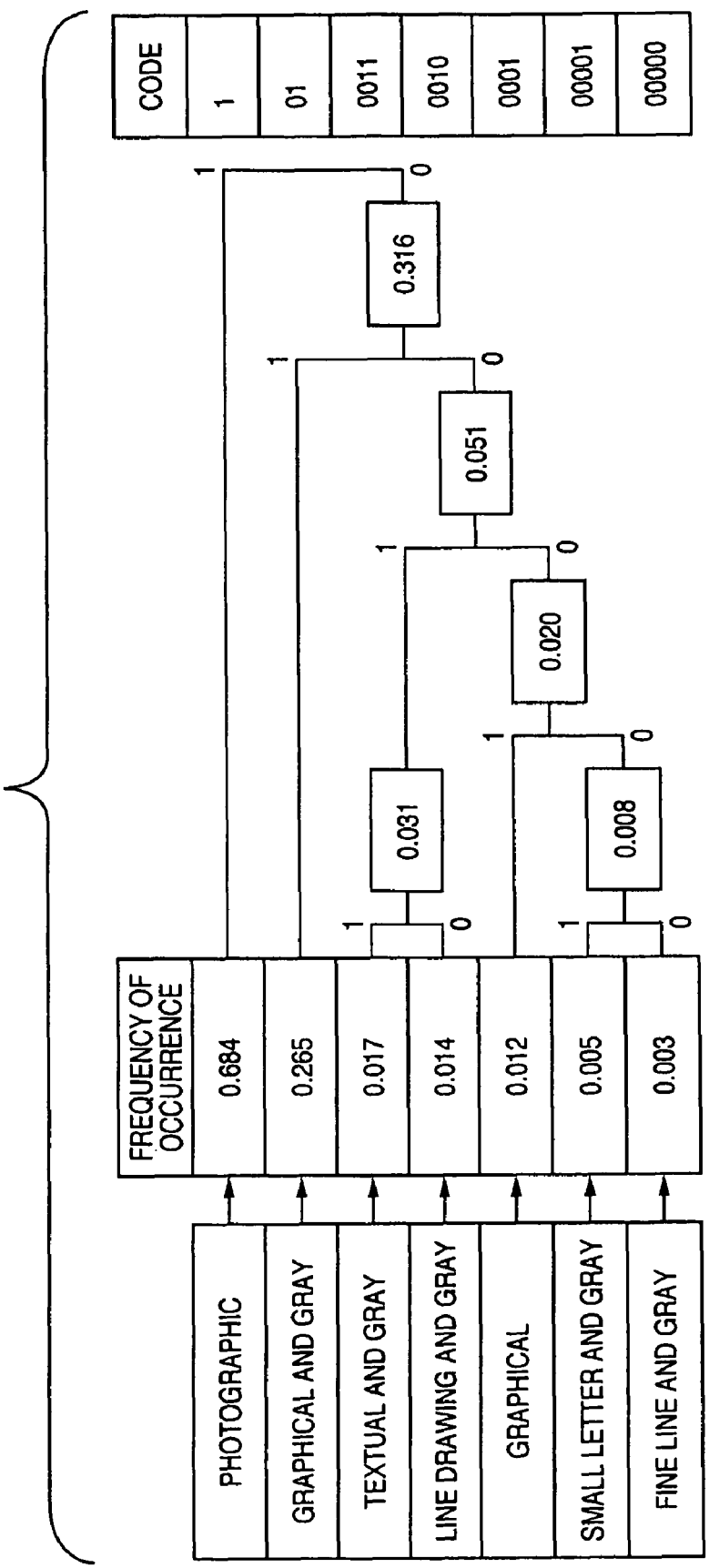

FIGS. 19 to 21 are views for explaining the method of creating the attribute information table 407 by the attribute discrimination unit 405 and attribute information table creation unit 406 according to the fifth embodiment.

As shown in FIG. 19, simultaneously with calculations of the numbers of pixels, a frequency of occurrence i of each type of attribute region is calculated by:

$$i = Npt/Np \quad (2)$$

where Npt: the number of pixels for each type of attribute region, and

Np: the number of pixels of the entire bitmap image.

FIG. 20 is a view showing the definition results of attribute signals based on the frequencies of occurrence i of the types of attribute regions having significant frequencies of occurrence using Huffman encoding. That is, the types of attribute regions are sorted in descending order of frequency of occurrence i, and codes of attribute signals are determined as a result of Huffman encoding.

FIG. 21 shows the attribute information table 407 obtained as a result of Huffman encoding. FIG. 21 describes correspondence between default attribute signals used by the output image processor 411 and newly generated attribute signals for all the types of attribute regions included in the drawing command.

Note that application of generation of variable-length attribute signals must be changed depending on rendering algorithms. That is, when rendering is done by sorting drawing objects from back to front like in a painter algorithm, variable-length attribute signals cannot be applied. On the other hand, when rendering is done for respective pixels like in a scan line algorithm, the data size of each attribute signal can be reduced using variable-length attribute signals.

As described above, according to the fifth embodiment, since variable-length attribute signals are defined in accordance with the frequencies of occurrence of the types of attribute regions, the data sizes of attribute signals can be reduced.

Sixth Embodiment

Image processing according to the sixth embodiment of the present invention will be described hereinafter. The same reference numerals in the sixth embodiment denote the same parts as in the first to fifth embodiments, and a detailed description thereof will be omitted.

In the first to fifth embodiments, the processing executed when print processing is executed based on the drawing command received from the host computer 101 has been described. In the sixth embodiment, processing executed when a bitmap image input from the image input apparatus 102 such as the scanner 109, digital camera 110, or the like is to be printed will be explained.

Figure 22:
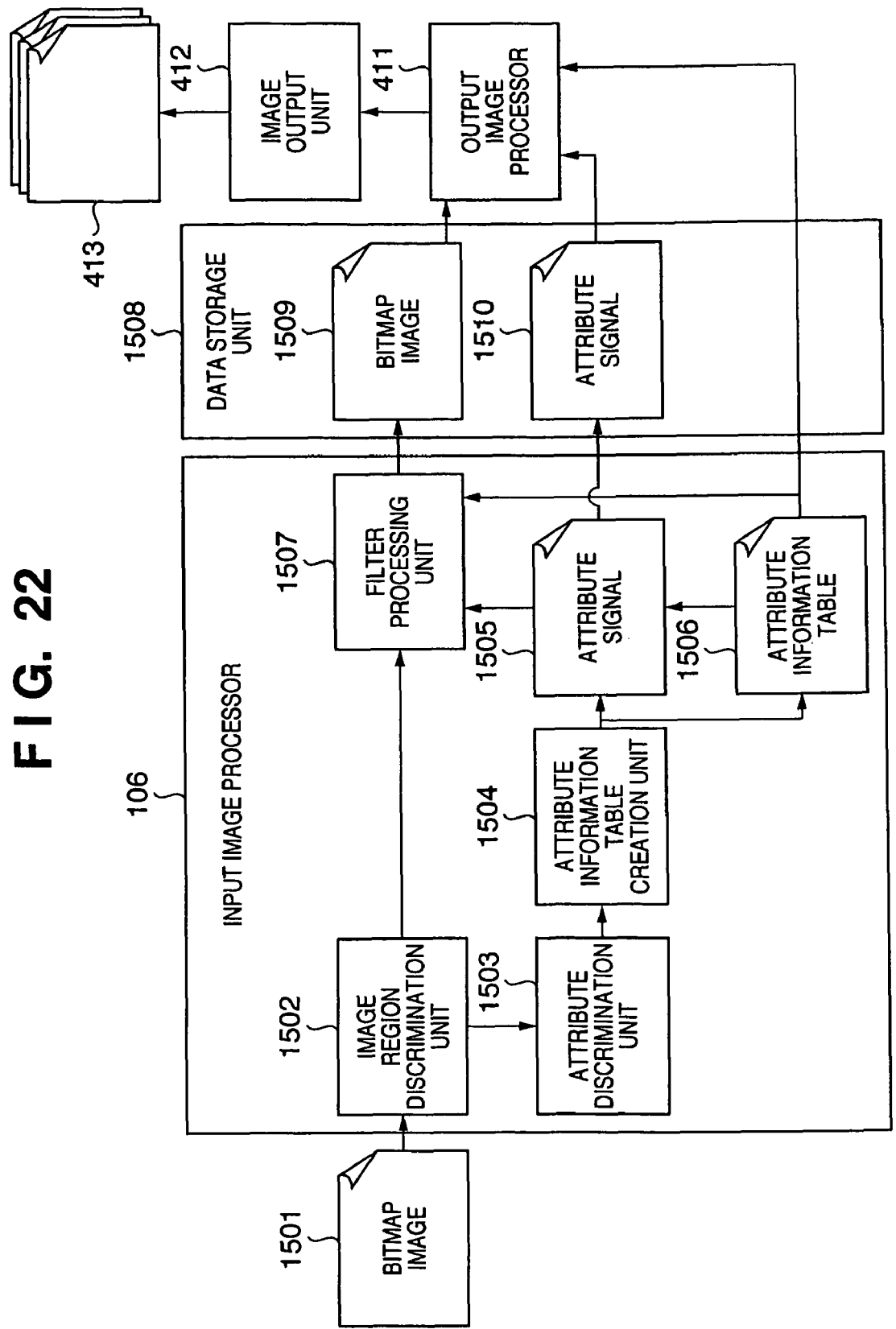
FIG. 22 is a block diagram showing an overview of the functional arrangement implemented by controller software of the MFP according to the sixth embodiment.

FIG. 22 is a block diagram showing an overview of the functional arrangement implemented by controller software of the MFP according to the sixth embodiment.

A bitmap image 1501 input from the image input apparatus 102 is input to the input image processor 106. An image region discrimination unit 1502 of the input image processor 106 discriminates attribute regions that include respective pixels of the bitmap image 1501. More specifically, the image region discrimination unit 1502 generates the histogram of pixel values and performs pattern matching, thus categorizing pixels to attribute regions such as a text region, chromatic or achromatic region, halftone dot region, and the like.

An attribute discrimination unit 1503 receives the discrimination result (image region information) of the image region discrimination unit 1502, and counts the number of types of attribute regions included in the bitmap image 1501. An attribute information table creation unit 1504 creates an attribute information table 1506 based on the number of types of attribute regions. Note that the method of creating the attribute information table 1506 is the same as that described in the first embodiment and the like. The attribute information table creation unit 1504 generates attribute signals 1505 based on the discrimination result (image region information) of the image region discrimination unit 1502 with reference to the attribute information table 1506.

On the other hand, a filter processing unit 1507 acquires information indicating the attribute regions with reference to the attribute signals 1505 and attribute information table 1506. The filter processing unit 1507 applies, to a textual attribute region, filter processing for emphasizing the sharpness of a character by emphasizing the high-frequency component of an image. Also, the filter processing unit 1507 applies so-called low-pass filter processing to a halftone-dot attribute region to remove moire components unique to the scanned digital image data.

In this manner, the input image processor 106 stores a bitmap image 1509 which is obtained by applying the filter processing to the input bitmap image 1501 for respective attribute regions based on the attribute signals 1505, and attribute signals 1510 in a data storage unit 1508.

The processing of the output image processor 411 after the bitmap image 1509, attribute signals 1510, and attribute information table 1506 are generated is the same as that in the first embodiment and the like, and a detailed description thereof will be omitted.

In the above description, the processing mode upon generation of attribute signals is not referred to. However, as in the second and third embodiments, it is easy to control the number of types of attribute regions in accordance with the processing mode. The limitations of the types of attribute regions in the fourth embodiment and the calculations of the numbers of pixels required upon generation of variable-length attribute signals in the fifth embodiment can be done upon acquisition of the image region information in the image region discrimination unit 1502.

As described above, according to the sixth embodiment, a case wherein the bitmap image input from the image input apparatus 102 such as the scanner 109, digital camera 110, or the like is to be printed can also be coped with.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-168411, filed Jun. 8, 2005, which is hereby incorporated by reference herein in its entirety.

What is claimed is:

1. An image processing apparatus comprising:
a receiver, configured to receive a drawing command;
a determiner, configured to determine attribute types of drawing objects contained in the drawing command;
a holding unit, configured to hold an attribute information table, which indicates correspondence of the determined attribute types to an attribute signal having M bits;
a rasterization section, configured to rasterize the drawing objects to generate a bitmap image, and configured to generate attribute signals, each of which has M bits and corresponds to each pixel of the bitmap image with reference to the attribute information table;
a data storage, configured to store the bitmap image and the attribute signals; and
an image processor, configured to convert the attribute signals stored in the data storage to attribute signals each of which has N bits with reference to the attribute information table, and to perform image processing on the bitmap image stored in the data storage with reference to the attribute signals each of which has N bits so as to print the bitmap image on which the image processing is performed by an image output unit,
wherein M and N are positive integers, and
wherein N is greater than M.

2. The apparatus according to claim 1, wherein the determiner determines predetermined attribute types corresponding to a processing mode indicated by the drawing command.

3. The apparatus according to claim 2, wherein a number of the predetermined attribute types corresponding to a first processing mode, which aims at high-speed printing, is less than a number of the predetermined attribute types corresponding to a second processing mode, which aims at high image quality.

4. The apparatus according to claim 3, wherein a bit length of the attribute signal having M bits in the first processing mode is shorter than that in the second processing mode.

5. An imaging processing method comprising:
using a processor to perform steps of:
receiving a drawing command;
determining attribute types of drawing objects contained in the drawing command;
holding an attribute information table, which indicates correspondence of the determined attribute types to an attribute signal having M bits;
rasterizing the drawing objects to generate a bitmap image, and generating attribute signals, each of which has M bits and corresponds to each pixel fo the bitmap image with reference to the attribute information table;
storing the bitmap image and the attribute signals in a data storage;
converting the attribute signals stored in the data storage to attribute signals each of which has N bits with reference to the attribute information table; and
performing image processing on the bitmap image stored in the data storage with reference to the attribute signals each of which has N bits so as to print the bitmap image on which the image processing is performed by an image output unit,
wherein M and N are positive integers, and
wherein N is greater than M.

6. The method according to claim 5, wherein in the determining step, the predetermined attribute types that correspond to a processing mode indicated by the drawing command are determined.

7. The method according to claim 6, wherein a number of the predetermined attribute types corresponding to a first processing mode, which aims at high-speed printing is less than a number of the predetermined attribute types corresponding to a second processing mode, which aims at high image quality.

8. The method according to claim 7, wherein a bit length of the attribute signal having M bits in the first processing mode is shorter than that in the second processing mode.

9. A non-transient computer-readable storage medium storing a computer-executable program for causing a computer to perform an image processing method, the method comprising steps of:
receiving a drawing command;
determining attribute types of drawing objects contained in the drawing command;
holding an attribute information table, which indicates correspondence of the determined attribute types to an attribute signal having M bits;
rasterizing the drawing objects to generate a bitmap image, and generating attribute signals, each of which has M bits and corresponds to each pixel of the bitmap image with reference to the attribute information table;
storing the bitmap image and the attribute signals in a data storage;
converting the attribute signals stored in the data storage to attribute signals each of which has N bits with reference to the attribute information table; and
performing image processing on the bitmap image stored in the data storage with reference to the attribute signals each of which has N bits so as to print the bitmap image on which the image processing is performed by an image output unit,
wherein M and N are positive integers, and
wherein N is greater than M.

* * * * *